Aug. 7, 1951  P. F. HAWLEY  2,562,912
PHASE SENSITIVE DEMODULATOR

Filed Feb. 25, 1947  2 Sheets-Sheet 1

INVENTOR.
PAUL F. HAWLEY
BY
Christie + Angus
ATTORNEYS

Aug. 7, 1951  P. F. HAWLEY  2,562,912
PHASE SENSITIVE DEMODULATOR
Filed Feb. 25, 1947  2 Sheets—Sheet 2

INVENTOR.
PAUL F. HAWLEY
BY
Christie & Angus
ATTORNEYS

Patented Aug. 7, 1951

2,562,912

UNITED STATES PATENT OFFICE 2,562,912

PHASE SENSITIVE DEMODULATOR

Paul F. Hawley, Pasadena, Calif., assignor to Consolidated Engineering Corporation, Pasadena, Calif., a corporation of California Application February 25, 1947, Serial No. 730,876

7 Claims. (Cl. 172—245)

This invention relates to demodulators and has for its principal object to provide a simple and effective demodulator which is sensitive in respect to phase.

There are many instances where a carrier wave has superimposed on it a modulation frequency or a voltage which may fluctuate or vary from time to time in its direction, and it is desirable to demodulate the carrier to determine the amplitude of this modulation or changeable voltage superimposed on the carrier. Demodulators have been used for this purpose; but the ordinary demodulator, while being capable of ascertaining the magnitude of the modulation or superimposed voltage, does not distinguish its phase or direction. It is desirable in many instances to be able to distinguish the phase or direction as well as the amplitude; and this I have accomplished by the provision of the demodulator in accordance with my present invention.

An important example of the application of such a demodulator is in connection with such equipment as seismometers, accelerometers and similar displacement or strain determining devices used for measuring static or dynamic displacement of bodies. In the measurement of vibrations or strains in such mechanical systems or bodies, it is the usual practice to place a pickup, sensitive to the vibrations or strain or displacement, at the points at which the measurement is desired, so that its magnitude will be converted to an electrical voltage at the pickup.

In many applications, the output of the pickup is superimposed on a carrier frequency, suitably amplified, and demodulated, and the demodulation component applied to a suitable indicating instrument such as a galvanometer, to obtain a record of the initial strain or vibration which was picked up. A way of doing this, for example, is to apply the carrier frequency across a suitable bridge having in one or more of its arms the element or elements of the strain gauge or accelerometer or whatever displacement measuring device is being used. By this arrangement, the output of the bridge will contain a component corresponding to the voltage from the pickup.

In such modulated carrier systems, the modulation voltage changes 180° in phase upon reversal of the conditions of the pickup, and this phase reversal will occur even though the amplitude remains constant. It is frequently important to be able to ascertain the phase relationship, for example, in such systems as when a strain gauge is being used. In such a system, both a compressive strain and an equal tensile strain would produce the same indication at the indicating device or galvanometer unless a phase sensitive device is provided between strain gauge and indicator.

In accordance with the invention, I provide a phase sensitive demodulator which will cause reversal of the demodulation component in correspondence with reversal of the modulation voltage impressed on the carrier. My novel demodulator comprises a pair of bridge type rectifiers arranged in a balanced system. There is applied across two opposite terminals of each of the bridge rectifier circuits a carrier voltage corresponding in frequency to the carrier of the modulated carrier voltage, and of a known phase. The modulated carrier voltage which is to be demodulated has one of its terminals connected to one remaining terminal of one bridge, and its other terminal connected to one remaining terminal of the other bridge. The mid-point of the modulated carrier voltage is connected by a lead to the two remaining bridge terminals. A galvanometer connected in this last lead will be sensitive to the amplitude and phase of the modulation product. By this arrangement, current will flow through one bridge rectifier circuit during one half of a cycle and through the other bridge rectifier circuit during the other half of the cycle.

The invention will be more clearly understood from the following detailed description and the accompanying drawing of which:

Figure 1:
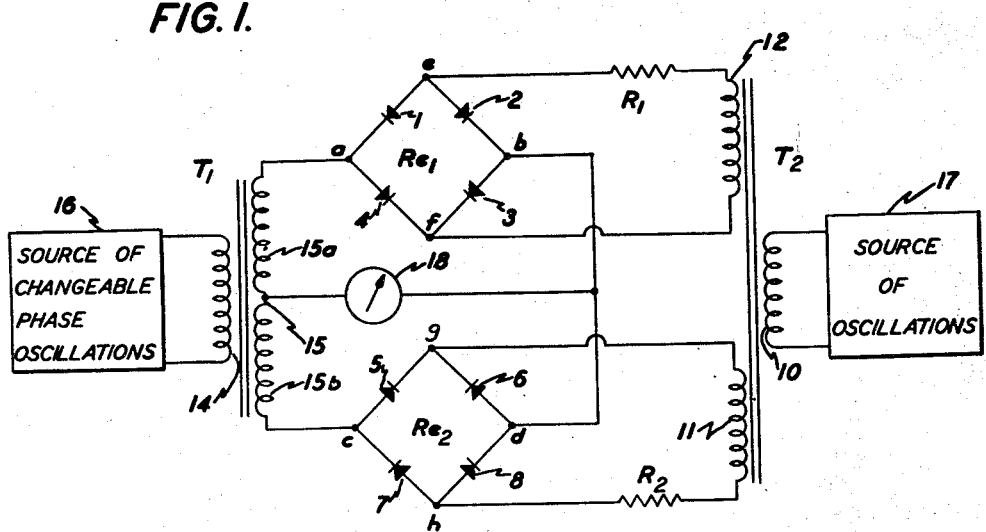
Fig. 1 is a schematic diagram of a phase sensitive demodulator according to my invention.

In Fig. 1, there is shown a demodulator circuit according to my invention. The demodulator comprises a pair of balanced demodulators $Re_1$ and $Re_2$ each being connected as a bridge type demodulator. The upper demodulator $Re_1$ comprises individual rectifying elements 1, 2, 3 and 4 arranged in the four arms of a bridge, and the lower demodulator $Re_2$ comprises individual rectifier elements 5, 6, 7 and 8, similarly arranged in the four arms of a bridge. The rectifier elements are indicated by conventional symbols, and of course may be of any type suitable for the purpose, such as a crystal rectifier or dry plate rectifier or diode tube rectifier or the like. It will be understood that each individual rectifier element is conductive in the direction indicated by the arrow of the symbol and is non-conducting in the opposite direction. The upper bridge has a pair of opposite terminals $a$ and $b$ and a second pair of opposite terminals $e$ and $f$. The lower bridge similarly has two opposite terminals $c$ and $d$ corresponding to the terminals $a$ and $b$ of bridge $Re_1$, and a second pair of opposite terminals $g$ and $h$, corresponding to terminals $e$ and $f$ of $Re_1$.

There are applied across the opposite terminals $e, f$ and $g, h$ of the respective bridge demodulators $Re_1$ and $Re_2$ a source of oscillations 17 of known frequency and phase. These oscillations are impressed on the bridge-arranged rectifiers through a transformer $T_2$ having a primary winding 10 and two secondary windings 11 and 12, the secondary winding 12 being connected across the bridge terminals $e$ and $f$ through a resistor $R_1$, and the winding 11 being connected across bridge terminals $g$ and $h$ through a resistor $R_2$. The resistors $R_1$ and $R_2$ may not always be necessary, but are often desirable to reduce the current flow.

The source of changeable phase oscillations whose amplitude and phase are to be ascertained by the demodulator is represented as the source 16; and this is connected to the demodulator through a transformer $T_1$ having a primary winding 14 and a balanced secondary winding having the two balanced portions 15a and 15b with a center tap 15. The outer terminal of the secondary winding portion 15a is connected to terminal $a$ of bridge $Re_1$, and the outer terminal of winding portion 15b is connected to terminal $c$ of bridge $Re_2$. The mid tap 15 is connected through a galvanometer 18 and thence on to both terminals $b$ and $d$ of the demodulator. The source of oscillations 16 is a carrier frequency of the same frequencies as source 17 and is assumed to have superimposed on it the fluctuatable or modulation voltage which is desired to separate out in the demodulator with a phase significance.

The source of oscillations 17 is impressed through the secondary winding 11 and 12 on the respective demodulators $Re_2$ and $Re_1$. During one half cycle of the oscillations of source 17, current flows through one of the bridge rectifiers, for example, $Re_1$ and during the same half cycle it is stopped from flowing through the other bridge rectifier $Re_2$. During the next half cycle, rectifier $Re_2$ is conducting while rectifier $Re_1$ is blocking. During the half cycle that rectifier $Re_1$ is conducting, the resistance between its output terminals $a, b$ is very low, but during the next half cycle the resistance between $a$ and $b$ is relatively high. Similarly rectifier $Re_2$ alternately has a low resistance and an extermely high resistance between its terminals $c$ and $d$. This is analagous to having a synchronous switch closed across $a, b$ during half of each cycle and open during the other half; and another synchronous switch closed acorss terminals $c, d$ while that across $a, b$ is open.

Assuming that the voltage applied to transformer $T_1$ from the source of changeable phase oscillations 16 is in phase with the voltage of the secondary winding 12 of transformer $T_2$, current will flow through rectifier $Re_1$ and its terminals $a, b$ during the half cycle when $Re_1$ is conducting and will flow through terminals $c, d$ of rectifier $Re_2$ during the next half cycle. The current through the galvanometer 18 will be in the same direction for both half cycles of voltage from transformer $T_1$. Current through the galvanometer will be the well known full wave rectifier current, the amplitude of which depends upon the voltage from changeable source 16.

Now if the phase of the voltage applied to transformer $T_1$ should reverse 180°, while the phase at the source 17 remains the same, current will flow through terminals $c, d$ and the galvanometer during the same half-cycle that it was flowing through terminals $a, b$ and the galvanometer prior to the phase reversal. The magnitude of this current will still be proportional to the voltage applied to transformer $T_1$, but the direction of the current will be reversed from what it was prior to the 180° reversal at source 16. Since the galvanometer itself is of the type which deflects in one direction when current flows one way through it, and in the opposite direction when the current reverses, this will deflect the galvanometer reading in the opposite direction, but by the same amount, assuming the amplitude of source 16 to remain constant.

Accordingly this system is in this manner a phase sensitive demodulator. The galvanometer responds to the average value of the current flowing through it, assuming that its natural frequency is relatively low as compared with that of the voltages applied to transfers $T_1$ and $T_2$. For voltages applied to transformer $T_1$, which are intermediate in phase between the zero and 180° phase conditions described above, the average current flowing through the galvanometer is proportional to the cosine of the phase angle between the voltages of sources 16 and 17.

Figure 2:
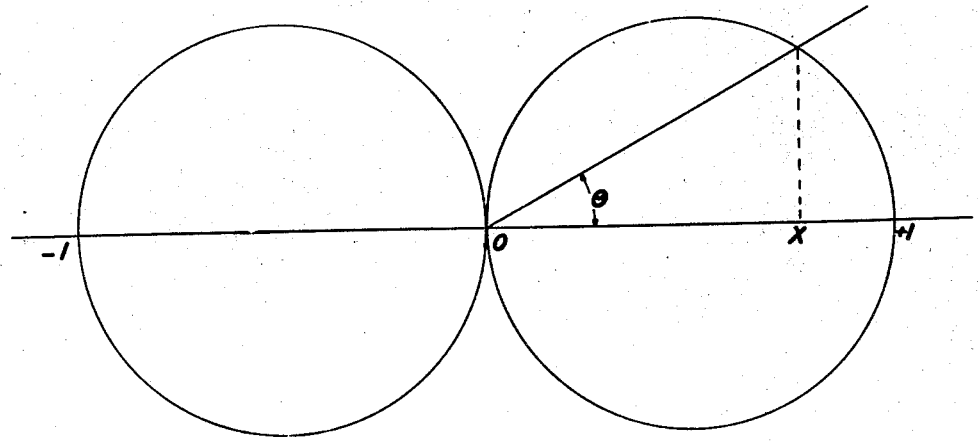
Fig. 2 shows graphically the phase relationships in the system of Fig. 1.

This is illustrated in the graph of Fig. 2 in which angle $\theta$ represents the phase angle by which the voltage of the variable source 16 differs from the phase of the voltage of source 17. When the phase of the two sources is the same the phase angle will be zero, and the current amplitude will be unity, represented by the point marked $+1$ at the opposite side of the circle from zero. As the phase angle increases from zero, the vector sweeps around the right hand circle so that the amplitude of the demodulation current is proportional to the distance OX. For a 90° phase angle there will be no demodulation output. For phase angles between 90° and 270° the vector sweeps around the left hand circle; and for a 180° phase reversal OX is equal to $-1$.

Figure 3:
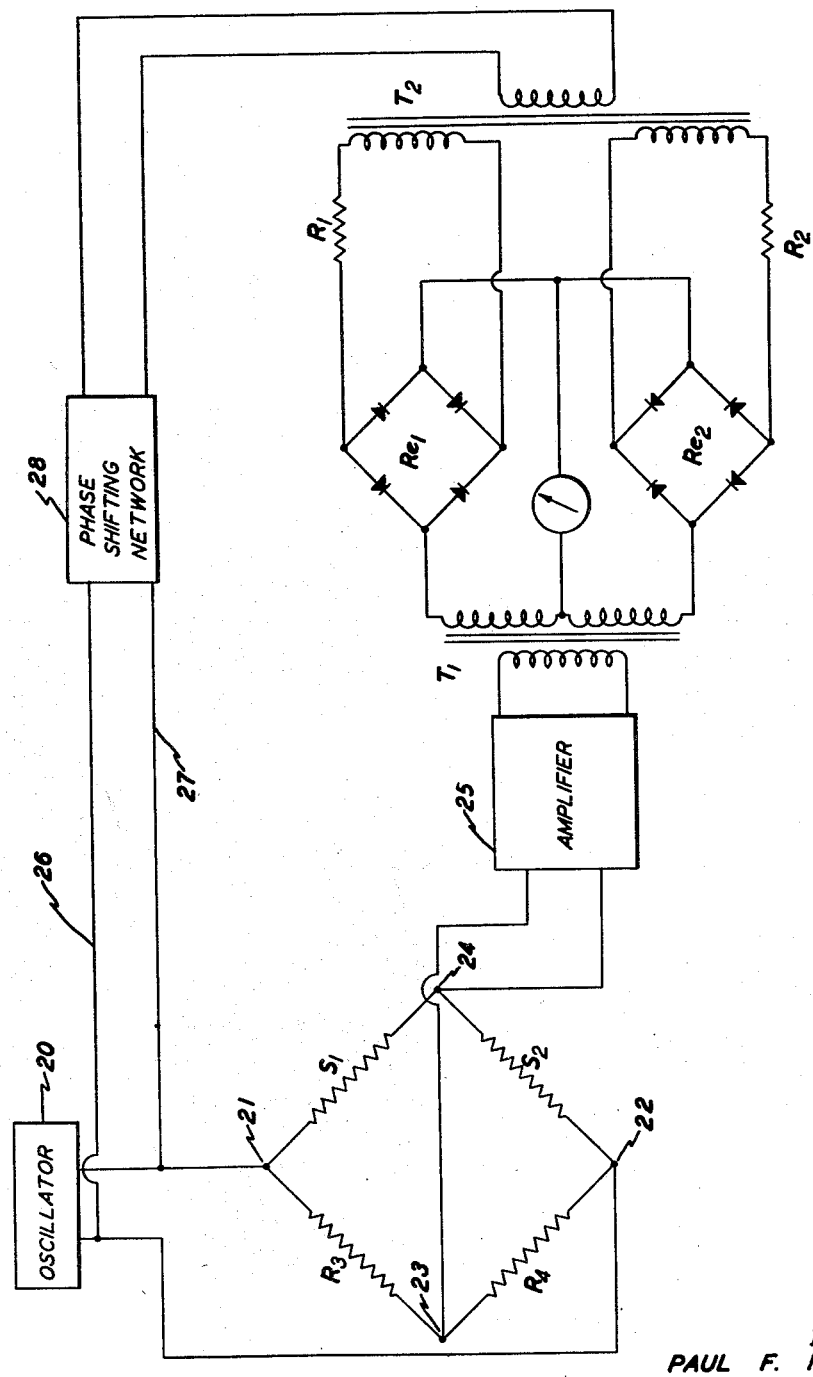
Fig. 3 shows a system in which the phase sensitive demodulator is used.

Fig. 3 illustrates a system in which the demodulator has useful application. The system is a displacement measuring system of a type comprising a bridge having four bridge arms $R_3$, $R_4$, $S_1$ and $S_2$. The elements $R_3$ and $R_4$ may, for example, be resistances or impedances, and the elements $S_1$ and $S_2$ may be the elements of a strain gauge or accelerometer or other displacement measuring device. A source of oscillations 20 is connected across the input terminals 21 and 22 of the bridge; and normally the bridge is maintained in a balanced condition so that in the absence of displacement which is to be detected or measured there is no output voltage across the output terminals 23 and 24. An amplifier 25 is preferably connected to the output terminals 23 and 24, and the output of the amplifier carried to the primary winding of the transformer $T_1$ of the demodulator circuit illustrated in Fig. 1. Accordingly, when the bridge is unbalanced by a displacement, which may be of either a dynamic or static character, there is a corresponding carrier frequency output voltage at the output terminals 23 and 24 which is directly proportional to the bridge unbalance.

The output of oscillator 20 is also connected to the primary winding of transformer T₂ of the demodulator circuit over the leads 26 and 27; but these two leads have included in them a phase shifting network 28 so that the phase of the voltage applied to transformer T₂ may be adjusted. It will be desirable to operate the phase shifting network 28 until the phase of the frequency at transformer T₂ is brought into phase with the voltage at transformer T₁, that is, until the condition of zero or 180° phase angle is had, as explained hereinabove. This will be represented by maximum deflection of the galvanometer, representing either the condition at +1 or −1 in Fig. 2. In this way, the demodulator circuit will function as described in connection with Fig. 1, and the deflection of the galvanometer will represent the displacement being measured by the pickup elements S₁ and S₂ in the pickup bridge.

An advantageous feature of the demodulator circuit is that it is only necessary to balance the bridge connected to the amplifier input or voltages in phase with the phase control circuit, since output voltages at 90° to this voltage can give zero output only across the galvanometer. This is apparent by reference to the graph of Fig. 2. This of course, refers to the average current through which the galvanometer is responsive. The high frequency alternating current of carrier frequency, or harmonics thereof does not obey this law but there is no necessity in considering them in the normal case as the galvanometer is not responsive to these signals. The effect, in any case, can be minimized by connecting a condenser across the galvanometer, the reactance of which is low at carrier frequencies and high at demodulated frequencies.

Another feature of the circuit of the invention is its response to harmonics of the phase control circuit. Such harmonics are usually due to iron in the pickup circuit, giving third, fifth and other odd harmonics and to slight overloading in the oscillator driving the bridge and phase control circuit, which generally produces even harmonics. It has been shown that even harmonics cancel out in the output across the galvanometer and that odd harmonics are automatically attenuated by the factor 1/N where N is the order of the harmonic. This is an additionally advantageous point since response to harmonics is entirely undesirable.

Another advantageous feature of this type of demodulator is that the amplifier (Fig. 3) need handle only the amplified output of the pickup bridge whereas in other known circuits the amplifier had to handle the algebraic sum of both the injected carrier and the amplified bridge output. Thus, lower signals can be handled with the double bridge demodulator amplifier, of the present invention, resulting in a less intense use of the tubes.

I claim:

1. A demodulator circuit comprising a pair of bridge-arranged rectifiers, each bridge rectifier having four bridge arms, means for connecting a carrier frequency voltage to said bridge rectifiers, said means comprising a transformer having a primary winding and a pair of secondary windings, one of the secondary windings being connected across a pair of opposite terminals of one of the bridge rectifiers, and the other secondary winding being connected across a pair of opposite terminals of the other bridge rectifier, means for impressing on the two bridge rectifiers a variable amplitude carrier frequency voltage of the same frequency as that of the first mentioned carrier frequency voltage, the last mentioned means having a terminal connected to a remaining terminal of one of the bridge rectifiers and another terminal connected to a remaining terminal of the other bridge rectifier, the last remaining terminal of each bridge rectifier being connected together, and a galvanometer connected from the midpoint of said last mentioned carrier frequency voltage to the last mentioned terminals.

2. A demodulator circuit comprising a pair of bridge arranged rectifiers, each bridge rectifier having four bridge arms, means for connecting a carrier frequency voltage to a pair of opposite terminals of each rectifier, said means comprising a transformer having a primary winding and a pair of secondary windings, each of the secondary windings being respectively connected across a pair of opposite terminals of each of the bridge rectifiers, means for impressing on the circuit a variable amplitude carrier frequency voltage, of the same frequency as that of the first mentioned carrier frequency voltage the last mentioned means comprising a terminal connected to one remaining terminal of each bridge rectifier, the other remaining terminals of the bridge rectifiers being connected together, and a galvanometer connected from the midpoint of said modulated carrier frequency source to the latter pair of terminals.

3. A demodulator circuit comprising a pair of bridge arranged rectifiers, each bridge rectifier having four arms, each bridge rectifier having a first pair of opposite terminals and a second pair of opposite terminals, means for connecting a source of oscillation of a carrier frequency to the first pair of opposite terminals of each bridge rectifier, the phases of the oscillation supplied to the two rectifiers and the directions of rectification being such that during the parts of a cycle when current is flowing from the first to the second pair of terminals of one of the bridges it is being blocked from flowing to the second pair of terminals of the other bridge, a second source of carrier frequency oscillations of the same frequency as the first source and having a variable amplitude, said second source being connected between one of the second pair of terminals at one of the bridges and one of the second pair of terminals of the other of the bridges, the remaining ones of the second pair of terminals of the two bridges being connected together, and an indicating device connected between the last mentioned connection and the midpoint of the second voltage source, said indicator being responsive to change of direction of current through it whereby it will give an indication of a change of phase of the second voltage source relative to the first voltage source.

4. A demodulator circuit according to claim 3 in which the phase of the first voltage source is adjustable.

5. A demodulator circuit comprising a pair of bridge arranged rectifiers, each bridge rectifier having four bridge arms with a rectifier element in it, each bridge rectifier having a pair of opposite input terminals and a conjugate pair of opposite output terminals, the output circuits of the two bridges being combined, a carrier frequency voltage of the same frequency applied across the pair of input terminals of each bridge rectifier, the direction of conductivity of the elements of each bridge rectifier and the phase direction of the voltages on the pairs of input terminals being such that current flows to the output terminals of one bridge rectifier during the part of the cycle when it is blocked from flowing through the other rectifier, and vice versa, whereby current flows in the combined output circuit alternately, but in the same direction, from the two bridge rectifiers, a carrier frequency voltage source having a variable amplitude connected between one of the output terminals of one bridge rectifier and one of the output terminals of the other bridge rectifier, the combined output circuits being connected to the midpoint of the last mentioned voltage source, and an indicator sensitive to direction of current flow connected in said combined output circuit whereby the phase of the voltage of the last mentioned source relative to that of the first mentioned source will be indicated by the indicator.

6. In combination with a pick up, a carrier amplifier connected to receive and amplify the output of the pick up and an oscillator connected to supply a carrier signal to the pick up, a phase sensitive demodulator capable of reversing the demodulated signal of said amplifier upon the occurrence of 180° variance in phase in the pick up circuit, said phase sensitive demodulator comprising a first transformer having a primary and a secondary winding, the primary winding being connected to receive the output of said amplifier, a second transformer having a primary and two secondary windings, the primary winding of the second transformer being connected to the oscillator, two bridge rectifiers connected by their opposite diagonal points to different secondary windings of the second transformer, a galvanometer element connected in parallel with the alternate points of said rectifiers and the secondary winding of the first transformer.

7. In combination with a pick up, a carrier amplifier connected to receive and amplify the output of the pick up and an oscillator connected to supply a carrier signal to the pick up, a phase sensitive demodulator capable of reversing the demodulated signal of said amplifier upon the occurrence of 180° variance in phase in the pick up circuit, said phase sensitive demodulator comprising a first transformer having a primary and a center-tapped secondary winding, the primary winding being connected to receive the output of said amplifier, a second transformer having a primary and two secondary windings, the primary winding of the second transformer being connected to the oscillator, two bridge rectifiers, each end of the second winding of the first transformer being connected to a respective diagonal of the respective rectifiers, each of said rectifiers being connected by two of its opposite diagonal points to a different one of the secondary windings of the second transformer, a galvanometer element connected at one side to said center tap and being connected in parallel with the series arrangement of each bridge rectifier and the portion of the secondary winding between the center tap and the respective rectifier.

PAUL F. HAWLEY.

REFERENCES CITED

The following references are of record in the file of this patent:

UNITED STATES PATENTS

| Number | Name | Date |
|---|---|---|
| 1,929,216 | Pfannenmuller | Oct. 3, 1933 |
| 2,059,594 | Massa | Nov. 3, 1936 |
| 2,240,184 | Hathaway | Apr. 29, 1941 |
| 2,316,008 | Ludbrook | Apr. 6, 1943 |
| 2,410,386 | Miller | Oct. 29, 1946 |
| 2,414,318 | Middel | Jan. 14, 1947 |
| 2,417,807 | Brunner | Mar. 25, 1947 |